(12) United States Patent
St. Pierre (10) Patent No.: US 9,403,411 B2
(45) Date of Patent: Aug. 2, 2016

(54) EXTENDABLE TRAILER MOUNT (71) Applicant: Kenneth Weiklund St. Pierre, Roundup, MT (US)

(72) Inventor: Kenneth Weiklund St. Pierre, Roundup, MT (US)

( * ) Notice: Subject to any disclaimer, the term of this patent is extended or adjusted under 35 U.S.C. 154(b) by 0 days.

(21) Appl. No.: 14/256,820

(22) Filed: Apr. 18, 2014

(65) Prior Publication Data
US 2014/0312594 A1    Oct. 23, 2014

Related U.S. Application Data (60) Provisional application No. 61/813,446, filed on Apr. 18, 2013.

(51) Int. Cl.
*B60D 1/155* (2006.01)
*B60D 1/07* (2006.01)

(52) U.S. Cl.
CPC .............. *B60D 1/155* (2013.01); *B60D 1/075* (2013.01)

(58) Field of Classification Search
CPC ............ B60D 1/036; B60D 1/155; B60P 3/10
USPC .......... 280/414.1, 446.1, 478.1, 479.1, 479.2, 280/479.3, 491.2
See application file for complete search history.

(56) References Cited

U.S. PATENT DOCUMENTS

| 2003/0132606 A1* | 7/2003 | Eskridge | 280/482 |
| 2007/0138760 A1* | 6/2007 | Granzow | 280/491.2 |
| 2010/0213687 A1* | 8/2010 | McDaniel et al. | 280/491.2 |

OTHER PUBLICATIONS

U.S. Appl. No. 61/813,446, filed Apr. 18, 2013; Titled: Extendable and retractable trailer hitch electric powered 12 volts.

* cited by examiner

*Primary Examiner* — Anne Marie Boehler
*Assistant Examiner* — Felicia L Brittman
(74) *Attorney, Agent, or Firm* — Santangelo Law Offices, P.C.

(57) ABSTRACT

The inventive technology relates to methods and apparatus for an improved self-contained extendable trailer mount that may be independently used, and/or retrofitted to existing vehicle mount/hitch systems.

20 Claims, 4 Drawing Sheets

EXTENDABLE TRAILER MOUNT

This application claims the benefit of and priority to U.S. Provisional Application No. 61/813,446 filed Apr. 18, 2013. The entire specification and figures of the above-mentioned application is hereby incorporated, in its entirety by reference.

TECHNICAL FIELD

The inventive technology generally relates to the field of trailer mounts and/or hitches typically utilized for towing recreational vehicles such as boats and the like. In particular, the invention relates to methods and apparatus for an improved self-contained extendable trailer mount that may be independently used, and/or retrofitted to existing vehicle mount/hitch systems.

BACKGROUND OF THE INVENTION

Common trailer mounts and hitch systems have been traditionally been used to transport secondary vehicles, such as trailers, boats and other recreational vehicles and miscellaneous freight. However, such common systems are limited in their practical usefulness, especially when such common trailer system are used to load and unload vehicles and/or cargo on included surfaces, or unloading and unloading, for example vehicles into, and out of water. In such situations, common stationary mounts must operate as a single static mount while the attached vehicle must maneuver the trailer mount into the proper positions. For example, in the case of inserting or withdrawing a boat from a body of water a vehicle must be maneuvered to the approximate edge if not further into the body of water before the boat may be released from the trailer mount. A similar situation must also occur when re-engaging a boat to a trailer mount to remove it from the water. Such vehicle maneuvering can be problematic, if not impossible, where there are limited number of individuals to assist, as well as steep incline of some boat ramps. Such maneuvers may be further complicated in instances where a body of water does not have a dedicated boat ramp or other inlet capability. In many instances such as these it is possible for the vehicle to enter the water, or its approximate edge and become stuck. Clearly a comprehensive solution is required to the drawbacks of such traditional stationary vehicle maneuvered trailer systems. As such, there is a need for a single comprehensive solution to the limitations described above.

The foregoing problems regarding conventional trailer mount systems may represent a long-felt need for an effective solution to the same. While implementing elements may have been available, actual attempts to meet this need may have been lacking to some degree. This may have been due to a failure of those having ordinary skill in the art to fully appreciate or understand the nature of the problems and challenges involved. As a result of this lack of understanding, attempts to meet these long-felt needs may have failed to effectively solve one or more of the problems or challenges here identified. These attempts may even have led away from the technical directions taken by the present inventive technology and may even result in the achievements of the present inventive technology being considered to some degree an unexpected result of the approach taken by some in the field.

The current inventive technology provides a single comprehensive solution, which in some embodiments is expressed in various methods and apparatus for an extendable trailer mount. In certain embodiments, the invention including an extendable trailer mount that utilized both threaded and/or non-threaded drive train mechanisms coupled with a driver, such as a self-contained driver, such as an electrical motor drawing power from the vehicle itself. Additional embodiments may also include an improved drive train system incorporating interlinked extendable and stationary cylinders which house a threaded drive shaft, again, responsive to a driver. This drive may generate rotational movement of the drive shaft which is threaded into a drive shaft coupler which is further secured to a guide cylinder. This guide cylinder may further be secured to an extendable cylinder as discussed below. Rotational movement of the drive shaft may cause the drive shaft coupler and associated guide cylinder to traverse the length of the drive shaft which in turn, similar to a mechanical ram, exerts an extension or retraction force on an extendable cylinder causing a responsive and desired movement. This extension and retraction may be controlled by a user through a controller, such as a push-button actuator, which may be wired or wireless. Such a novel drive train and extension/retraction mechanism overcomes the limitations of traditional trailer systems discussed above. For example, the current invention allows for not only a novel drive train and extension mechanisms, such systems are sufficiently tractable and well as sturdy to resist both weight, sheet and other torsional forces that are applied to trailer system, for example, during loading and unloading a vehicle in water at an include. In this manner, a vehicle may be positioned at a safe distance from a body of water and inserted and/or retracted from the water through movement of the extendable trailer mount.

DETAILED DESCRIPTION OF THE INVENTION

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Figure 1:
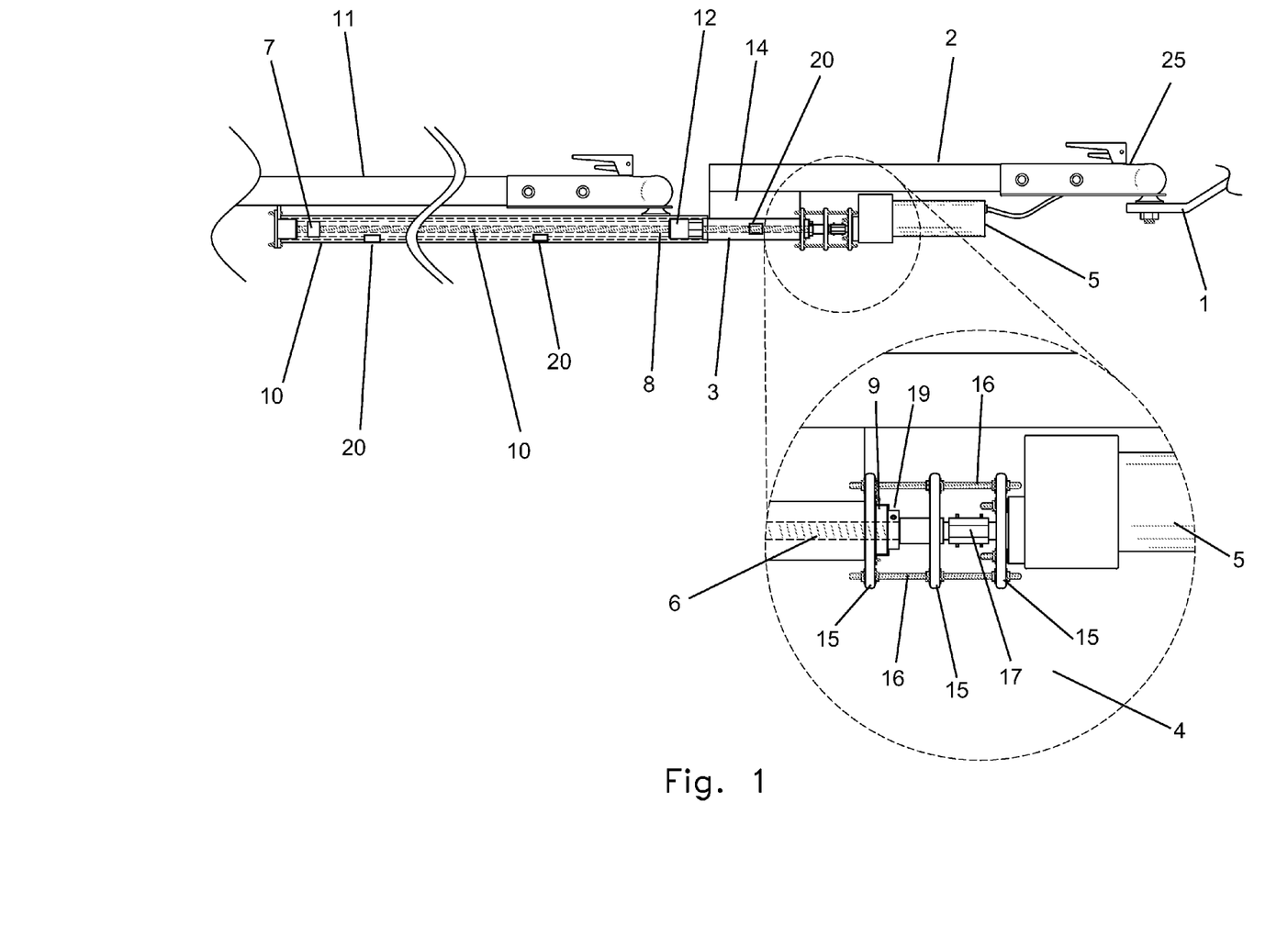
FIG. 1: is a front view of an extendable trailer mount with a blow-up view of a drive housing having a drive coupled to a drive shaft in one embodiment thereof.

Referring to FIG. 1, in one embodiment the inventive technology include methods and apparatus for an extendable trailer mount. In a preferred embodiment a trailer mount (1)

may be secured to a vehicle. This coupling may be accomplished through the attachment of a stationary vehicle trailer mount (1) to at least one trailer mount extension (2). In some embodiments, stationary vehicle trailer mount (1) may be a vehicle hitch. As shown in FIG. 1, in a preferred embodiments a trailer mount extension (2) may be coupled, perhaps through a vehicle hitch coupler (25), to a ball and socket hitch.

Again referring generally to FIGS. 1-4, in some embodiments trailer mount extender (14) may be secured to a trailer mount extension (2). This coupling may be removable, such as through a locking coupler, or permanent, such as through a welded joint. This trailer mount extender (14) may be variable in size depending on the size of the vehicle, as well as perhaps the weight of the vehicle or cargo to be towed. In another embodiment, this trailer mount extender (14) may be tractable such that it may have a limited or even free range of movement, for example through a single or multi-directional joint. As shown in FIG. 1, in a preferred embodiment a trailer mount extender (14) and/or trailer mount extension (2) may be secured to at least one stationary cylinder (3). Again, this coupling, as with all couplings contemplated herein may be removable, such as through a locking coupler, or permanent, such as through a welded joint. This stationary cylinder (3) may be in some embodiments a seamless stationary cylinder (3) so as to allow lateral movement of an extendable cylinder (10) as will be discussed below. This stationary cylinder (3) may also include a variety of configurations such as a circular, as well as square stationary cylinder (3) and the like.

Again referring to FIG. 1, a trailer mount extender (14) and/or trailer mount extension (2) may be coupled with a drive housing. In additional embodiments, a stationary cylinder (3) may also independently, or additionally be secured to a drive housing (4). As shown in the blow-up view of FIG. 1, this drive housing (4) be secured to and/or support a drive (5). In the embodiment shown in figure one, the drive housing (4) may include one, or even a plurality of support plates coupled with said driver and said stationary cylinder. These support plates may be inter connected, for example, with a plurality of all-threads. This drive housing (4) may further include a drive housing cover (not shown) to prevent dirt, water or other weathering elements from coming into contact with the drive or drive train mechanism. In another embodiment, this drive housing (4) may be stationary, or tractable such that it may have multi- or unidirectional movement or buffering. Such tractability may be accomplished through the addition of buffers, such as shock absorbers as well as jointed couplers and the like.

As shown in figure one, this drive housing (4) may create a space where a drive shaft (6) may be coupled to a drive (5). In a referred embodiment, a drive shaft (6) may be coupled with a drive through a drive coupler (17). Again, as shown in FIG. 1, a drive coupler (17) may be secured to a drive, for example through a rotor and a drive shaft (6) through a drive coupler lock, which is shown herein as a pair of roll pins inserted internally through the drive coupler (17) securing both the drive (5) and drive shaft (6). In certain embodiments, this drive coupler (17) may also be tractable.

Again referring to FIG. 1, the drive housing may include a bearing (19) which may be secured in a bearing housing (9) and may further support the drive shaft (6). This bearing may be used in multiple, and in a preferred embodiment may include a circular bearing, that may be secured in a detachable housing such as a shaped clamp secured to the drive housing (4). In this embodiment, the detachable clamp may be released to allow the removal of the bearing as well as facilitate the removal of the drive shaft from the trailer mount. Additional embodiments may include a housing nut secured to said drive shaft, which may further be supported by a bearing or by the drive housing (4) to facilitate rotation and maintain the position of the drive shaft (6) in relation to the drive (5) and/or drive coupler (17).

It should also be noted that a variety of drives (5) may be contemplated in the current invention. For example, in a preferred embodiment, an electrical motor may be coupled to a drive shaft that may generate rotational movement. However, additional drives may be included singly or in plurality, as well as in series, in opposition or in parallel. Examples may include, but are not limited to: a pneumatic drive; a hydraulic drive; a servo-motor; a motor; a multi-geared motor; a single gear motor; a conveyor drive; manual drive; and/or a flywheel drive.

Figure 2:
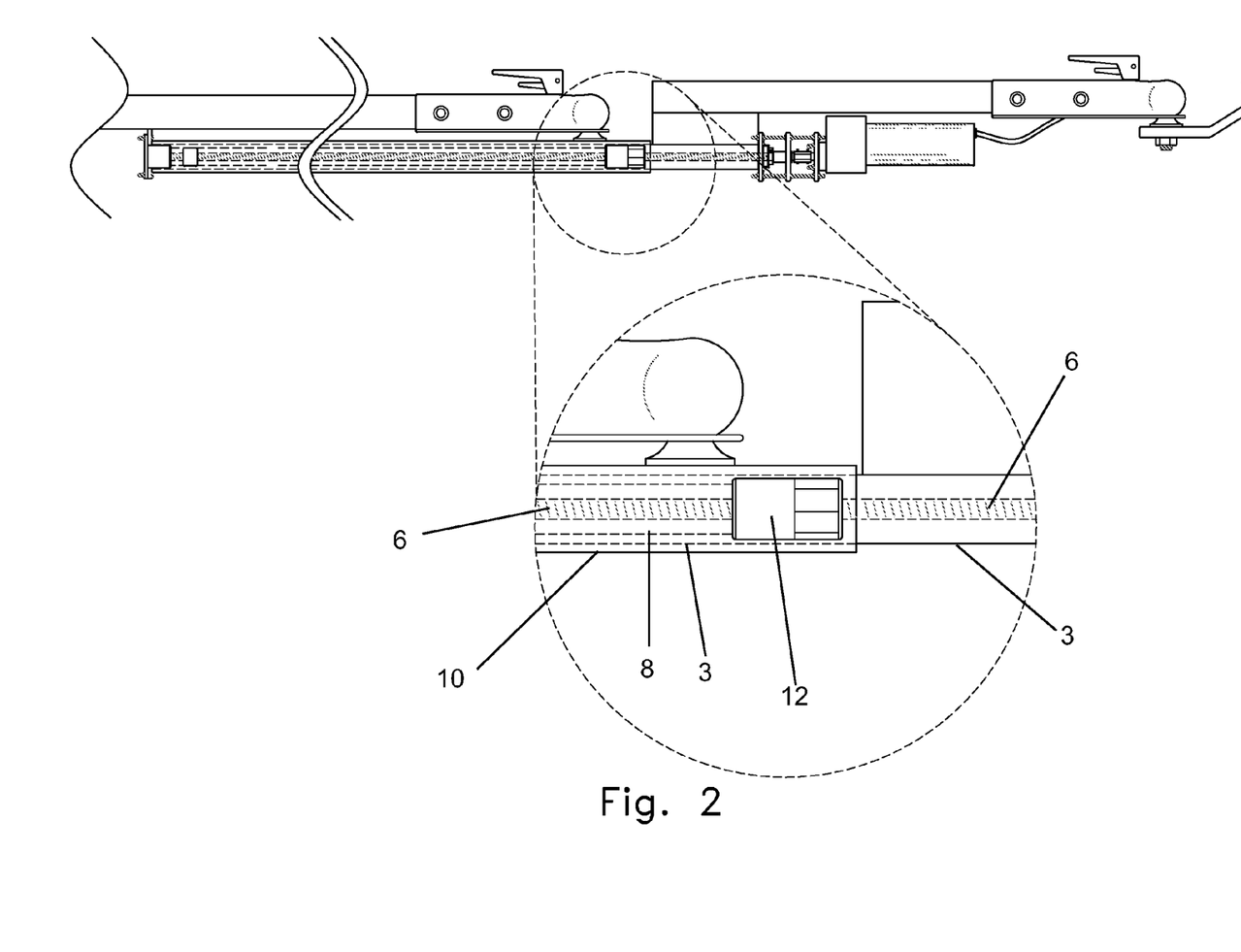
FIG. 2: is a front view of an extendable trailer mount with a blow-up view of a drive shaft coupler secured to a guide and threadably connected to said drive shaft in one embodiment thereof.
Figure 3:
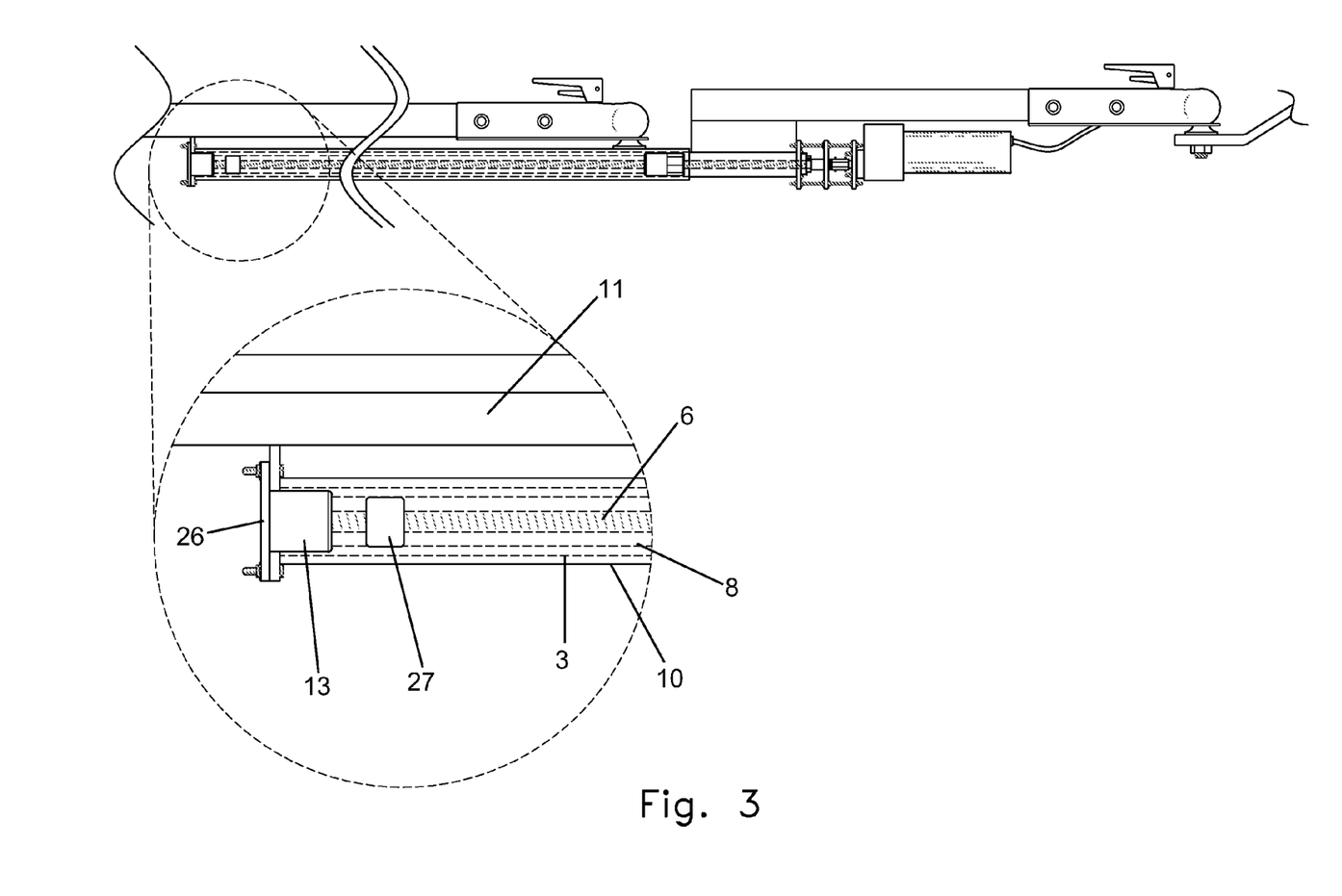
FIG. 3: is a front view of an extendable trailer mount with a blow-up view of an end bracket secured to said guide cylinder and said extendable cylinder.
Figure 4:
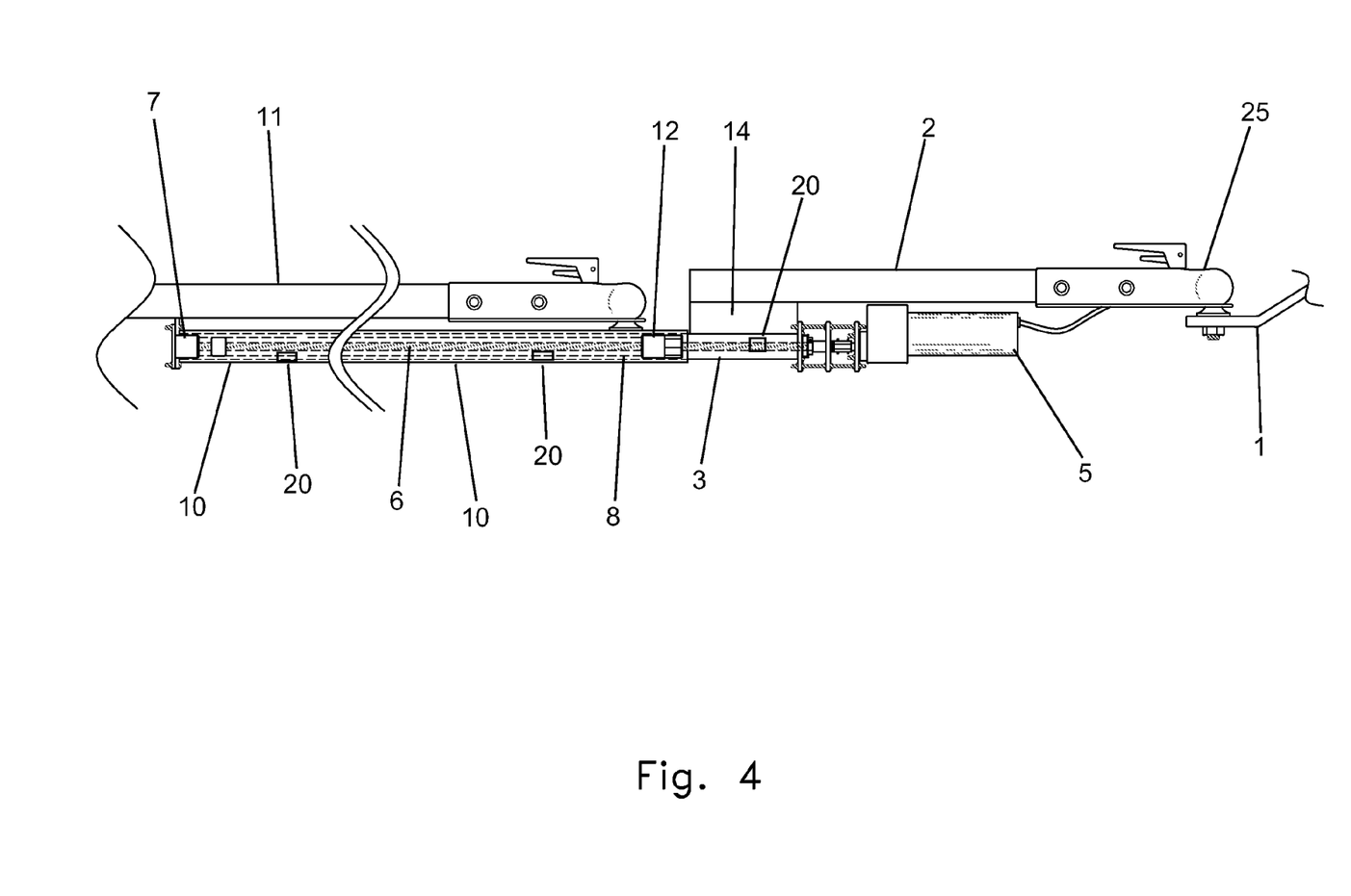
FIG. 4: is a front view of an extendable trailer mount in a retracted position in one embodiment thereof.

Referring more specifically to FIG. 2, the drive shaft (6) may be inserted into a guide cylinder (3) which may be positioned within the stationary cylinder. This may be accomplished in a preferred embodiment by threading the drive shaft (3) onto a drive shaft coupler (12) which is secured to a guide cylinder. This drive shaft coupler (12) may traverse with the coupled guide cylinder (3) along the length of the drive shaft (6) in response to rotational movement generated by innervation of a drive (5). This laterally moving guide cylinder (3) may be couple to an extendable cylinder (10) which is interlinked, in this case in an overlapping position with a stationary cylinder (3) forming a self-contained extendable unit. As shown in FIG. 3, in a preferred embodiment, an end bracket (13) may be coupled, in this case threadably secured the guide cylinder (3) and externally secured the extendable cylinder through at least one end plate (26) that is integral to, or secured to said end bracket (13).

Now generally referring to FIGS. 1-4, in one embodiment activating the drive (5) may generate rotational movement of a coupled drive shaft (6). This rotational movement may cause the drive shaft coupler (12) to traverse the length of the drive shaft (6) which in turn causes the attached guide cylinder (3) to traverse the length of the drive shaft (6). This transverse movement of the guide cylinder (3) exerts a force on the extendable cylinder (10) which, again in this embodiment is secured to the guide cylinder (3) through at least one end plate (26) and/or an end bracket (13). This exerted force communicated from the driver (5) through the drive shaft (6) through the drive shaft coupler (12) to the guide cylinder (3) and ultimately the extendable cylinder (10) may cause movement, such as in this case extension outward of the extendable cylinder (10). As shown in FIGS. 1-4, a trailer body (11) may be coupled to the extendable cylinder (10) allowing a supported vehicle, such as a boat to be extended outward from the vehicle. This trailer body (11) may be adjustably secured to said extendable cylinder (10) through an adjustable hitch coupler. In certain embodiments this adjustable hitch coupler may include a slide attachment coordinate with a ball and socket, or a slidable plate with a compression joint such as a u-joint to secure trailer body (11) extendable cylinder (10). This adjustable hitch coupler may further allow for even greater extension of the trailer body (11) increasing its effective range.

In certain embodiments, the extendable cylinder (10) may be prevented from extending past a certain point, perhaps through one or more mechanical stops which may provide a physical barrier to prevent extension of extendable cylinder (10) beyond a certain point. Such mechanical stops may include detachable stops which allow a user to customize the extension length, which additional embodiments may include secure stops to provide a default maximum extension length.

Naturally, reversing the drive, or activating an opposing drive, or even reversing a gear couple to the drive shaft may allow for rotational movement of the drive shaft in the opposite directions so as to generate a reverse rotational movement of said coupled drive shaft (6). This reverse rotational movement may cause the drive shaft coupler (12) to traverse back across the drive shaft (6) causing the guide cylinder (8) to retract. The retraction of the guide cylinder (8) will exert a pull force on the extendable cylinder (10) causing retraction of the extendable cylinder (10) to a default, starting or predetermined position.

In a preferred embodiment, one or more drives (5) may be controlled through a controller (not shown). This controller may be any electronic or other manual means of actuating the drive (5) to allow extension or retraction of the extending cylinder (10). In certain embodiments this controller is a computer device, and may be wired and/or wireless. In yet another embodiment, a drive (5) may be powered by a power source, such as a battery, hydraulic system, pneumatic pressure source and the like. In a preferred embodiment, a 12V electric drive may be connected to and drawn from the vehicles power source, such as a battery. This connection may be established through known trailer mount/hitch wiring connections such as for signaling lights which may also be adapted to the following invention.

Moreover, in a preferred embodiment an extendable cylinder (10) and a stationary cylinder may be secured (3), for example during transport, by a cylinder lock (not shown). In a preferred embodiment, a cylinder lock may include at least one plate, or coupler secured to a stationary cylinder or other stationary element and at least one plate, or coupler secured to the extendable cylinder. These plates or couplers may further be secured through a latch, snap lock or even secured by at least one lunch pin.

In another embodiment, the invention may include methods and apparatus for the extendable interlinking trailer mount. In this embodiment a trailer mount extension (2) may be secured to a vehicle. As noted previously a stationary cylinder (3) may be secured to the trailer mount extension (2). A drive (5) may also be coupled to, for example a stationary cylinder (3) and/or the trailer mount extension (2). The drive (5) may further be threadably coupling a drive shaft (6), which in this embodiment may be threaded. This drive shaft (6) may be secured, perhaps by being threaded onto secured into a drive shaft coupler (12) which is further secured to a guide cylinder (8) and internally positioned within said stationary cylinder (3). However, it should be noted that in some embodiments the drive shaft (6) coupled with a guide cylinder (8) may be externally positioned and responsive to said extendable cylinder (10). In this embodiment the guide cylinder (8) may be coupled to an extendable cylinder (10) which may be interlinked with the stationary cylinder (3) allowing lateral, or overlapping movement of the cylinders. In a preferred embodiment, the drive (5) may be activated generating rotational movement of the coupled drive shaft (6). This rotational movement may cause the drive shaft coupler (12) threadably connected to the rotating drive shaft (6) to traverse along the length of the drive shaft (6) causing the guide cylinder (3) to also traverse the length of the drive shaft (6). The action of this guiding cylinder may cause movement, in this example extension of the extendable cylinder (10) through extension of the guide cylinder (8). As noted elsewhere, one or more drives (5) may be actuated in reverse, thereby reversing the drive (5) so as to generate a reverse rotational movement of said coupled drive shaft causing said guide cylinder (8) to retract. This retraction of the guide cylinder may cause retraction of the extendable cylinder to an original or starting position suitable for towing a vehicle. It should be noted that in some embodiments such a drive may be a singular element that may rotate a drive shaft forward and backwards, while other embodiments, a plurality of drivers may be used, perhaps in opposition, or perhaps in a staggered configuration.

In another embodiment, the invention includes methods and apparatus for an extendable threaded trailer mount. In this embodiment, a trailer mount extension (2) to a vehicle. This trailer mount extension may be secured or coupled, the terms being generally interchangeable, with a stationary cylinder (3). This stationary cylinder may be interlinked at least one extendable cylinder (10) forming an internal cavity that may hold a threaded drive shaft (6) that is further coupled with a drive. Moreover, this threaded drive shaft (6) may be threadably coupled with extendable cylinder (10), for example through a continuous or transient thread, or through continuous or transient threaded internal interface. Activating the drive (5) may cause rotational movement of the threaded drive shaft (6) which may cause the extended cylinder to traverse the length of the threaded drive shaft, thereby extending the extendable cylinder (10) outward through operation of said threaded drive shaft. Naturally, reversing the actuation of the drive (5) may generate a reverse rotational movement of said coupled drive shaft causing the extended cylinder (10) to traverse back across the length of the threaded drive shaft thereby retracting the extendable cylinder (10) through operation of the threaded drive shaft. In a preferred embodiment at least one trailer body (11) may be secured to the extendable cylinder (1) which may support a vehicle, such as a boat during extension, retraction and travel of the trailer mount.

In some additional embodiments, the present invention may provide for method and apparatus for extending a trailer hitch. In this embodiment, at least one trailer mount or trailer mount extension (2) may be coupled to a vehicle, for example, through a vehicle hitch coupler. A stationary cylinder (3) may be interlinked with at least one extendable cylinder (10) which may be coupled and responsive to a drive such that activation of the drive may generate force necessary to extend and/or retract the extendable cylinder (10). In a preferred embodiment, this extendable cylinder (10) may be interlinked with said stationary cylinder (3) in such a manner that it is positioned over a stationary cylinder (3). This extendable cylinder may further be secured to a trailer body which may support a vehicle, such as a boat. In this configuration, as the extendable cylinder (10) extends and/or retracts, it may be supported and held in a guided position by the stationary cylinder (3).

Naturally, all embodiments discussed herein are merely illustrative and should not be construed to limit the scope of the inventive technology consistent with the broader inventive principles disclosed. As may be easily understood from the foregoing, the basic concepts of the present inventive technology may be embodied in a variety of ways. It generally involves systems, methods, techniques as well as devices to accomplish providing methods and apparatus for an extendable trailer mount and the like. In this application, the novel and/or improved extendable trailer mount techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the statements of invention. As can be easily understood from the foregoing, the basic concepts of the present invention may be embodied in a variety of ways. It involves both techniques as well as devices to accomplish the appropriate system for providing an extendable trailer mount the like. In this application, the techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in method-oriented terminology, each element of the claims corresponds to a device. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting any claims. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected and responsive to one another. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "coupler" should be understood to encompass disclosure of the act of "coupling"— whether explicitly discussed or not—and, conversely, were there effectively disclosure of the act of "coupling", such a disclosure should be understood to encompass disclosure of a "coupling method and/or technique, and or device" and even a "means for coupling." Such changes and alternative terms are to be understood to be explicitly included in the description.

Any patents, publications, or other references mentioned in this application for patent, such as in the specification or an IDS are hereby incorporated herein by reference in their entirety. Any priority case(s) claimed by this application is hereby appended and hereby incorporated herein by reference in their entirety. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated herein by reference in their entirety. Finally, all references listed in the list of References To Be Incorporated By Reference In Accordance With The Patent Application or other information disclosure statement and the like filed with the application are hereby appended and hereby incorporated herein by reference in their entirety, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the system (with corresponding methods and apparatus) of providing methods and/or apparatus for an extendable trailer mount in its various embodiments as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

In addition and as to automated and/or computer or controller aspects and each aspect amenable to programming or other electronic automation, the applicant(s) should be understood to have support to claim and make a statement of invention to at least: xvi) processes performed with the aid of or on a computer and or controller as described throughout the above discussion, xv) a programmable apparatus as described throughout the above discussion, xvi) a computer readable memory encoded with data to direct a computer comprising means or elements which function as described throughout the above discussion, xvii) a computer configured as herein disclosed and described, xviii) individual or combined subroutines and programs as herein disclosed and described, xix) the related methods disclosed and described, xx) similar, equivalent, and even implicit variations of each of these systems and methods, xxi) those alternative designs which accomplish each of the functions shown as are disclosed and described, xxii) those alternative designs and methods which accomplish each of the functions shown as are implicit to accomplish that which is disclosed and described, xxiii) each feature, component, and step shown as separate and independent inventions, and xxiv) the various combinations and permutations of each of the above.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. It should be understood that this application also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The inventive subject matter is to include, but certainly not be limited as, a system substantially as herein described with reference to any one or more of the Figures and Description (including the following: for example, the process according to any claims and further comprising any of the steps as shown in any Figures, separately, in any combination or permutation).

What is claimed is:

1. An extendable trailer mount comprising:
   a stationary vehicle trailer mount secured to at least one trailer mount extension;
   at least one stationary cylinder secured to said trailer mount extension;
   at least one drive housing supporting at least one drive;
   at least one drive shaft coupled with said drive wherein said drive shaft is threaded;
   at least one bearing supporting said drive shaft;
   a guide cylinder positioned over said drive shaft;
   a drive shaft coupler secured to said guide cylinder and threadably connected to said drive shaft;
   an extendable cylinder interlinked with said stationary cylinder;
   an end bracket secured to said guide cylinder and said extendable cylinder; and
   a trailer body secured to said extendable cylinder.

2. An interlinked extendable trailer mount comprising:
at least one stationary cylinder coupled to a drive housing;
a drive coupled to a drive shaft wherein said drive shaft is threaded;
a guide cylinder positioned over said drive shaft;
a drive shaft coupler secured to said guide cylinder and threadably connected to said drive shaft;
an extendable cylinder interlinked with said stationary cylinder and secured to said guide cylinder;
a trailer body secured to said extendable cylinder.

3. An interlinked extendable trailer mount as described in claim 2 further comprising at least one drive shaft coupler secured to said guide cylinder and said drive shaft.

4. An interlinked extendable trailer mount as described in claim 3 wherein said drive shaft coupler comprises at least one threadable nut secured to said guide cylinder and threadably connected to said drive shaft.

5. An interlinked extendable trailer mount as described in claim 2 further comprising an end bracket secured to said guide cylinder and said extendable cylinder.

6. An interlinked extendable trailer mount as described in claim 5 wherein said end bracket comprises at least one end bracket threadably secured to said guide cylinder and externally secured to said extendable cylinder through at least one end plate secured to said end bracket.

7. An interlinked extendable trailer mount as described in claim 2 wherein said drive comprises at least one drive selected from the group consisting of: an electric drive motor; a pneumatic drive; a hydraulic drive; a servo-motor; a motor; a multi-geared motor; a single gear motor; a conveyor drive; a manual drive; and a flywheel drive.

8. An interlinked extendable trailer mount as described in claim 2 further comprising at least one bearing.

9. An interlinked extendable trailer mount as described in claim 2 wherein said trailer body secured to said extendable cylinder comprises a trailer body adjustably secured to said extendable cylinder through an adjustable hitch coupler.

10. An interlinked extendable trailer mount as described in claim 2 further comprising a controller responsive to said drive.

11. An interlinked extendable trailer mount as described in claim 2 further comprising at least one power supply responsive to said drive.

12. An interlinked extendable trailer mount as described in claim 2 further comprising at least one cylinder lock.

13. An interlinked extendable trailer mount as described in claim 12 wherein said cylinder lock comprises at least one plate secured to said stationary cylinder and at least one plate secured to said extendable cylinder secured by at least one linchpin.

14. A threaded extendable trailer mount comprising:
at least one trailer mount extension coupled to a vehicle;
at least one stationary cylinder coupled to a drive;
at least one extendable cylinder interlinked with said stationary cylinder;
at least one threaded drive shaft coupled to said drive and threadably coupled with said extendable cylinder through at least one drive shaft coupler;
at least one guide cylinder positioned over said threaded drive shaft and secured with said drive shaft coupler and said extendable cylinder; and
at least one trailer body secured to said extendable cylinder.

15. A threaded extendable trailer mount as described in claim 14 wherein said drive comprises at least one drive selected from the group consisting of: an electric drive motor; a pneumatic drive; a hydraulic drive; a servo-motor; a motor; a multi-geared motor; a single gear motor; a conveyor drive; a manual drive; and a flywheel drive.

16. A threaded extendable trailer mount as described in claim 14 wherein said drive shaft coupled to said drive comprises a drive shaft coupled to said drive through a drive coupler.

17. A threaded extendable trailer mount as described in claim 14 further comprising at least one bearing.

18. A threaded extendable trailer mount as described in claim 14 further comprising a controller responsive to said drive.

19. A threaded extendable trailer mount as described in claim 14 further comprising at least one power supply responsive to said drive.

20. A threaded extendable trailer mount as described in claim 14 further comprising at least one cylinder lock.

* * * * *